United States Patent
Taniguchi (10) Patent No.: US 8,582,965 B2
(45) Date of Patent: Nov. 12, 2013

(54) IMAGE CAPTURING APPARATUS, METHOD FOR CONTROLLING IMAGE CAPTURING APPARATUS, AND METHOD FOR PREDICTING PHOTOMETRIC VALUE

(75) Inventor: Hidenori Taniguchi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 13/291,587

(22) Filed: Nov. 8, 2011

(65) Prior Publication Data

US 2012/0128341 A1    May 24, 2012

(30) Foreign Application Priority Data

Nov. 22, 2010  (JP) ................. 2010-260366

(51) Int. Cl.
*G03B 7/00* (2006.01)
*G03B 7/08* (2006.01)
*G03B 7/083* (2006.01)

(52) U.S. Cl.
CPC ..................... *G03B 7/083* (2013.01)
USPC ........................ 396/224; 396/234

(58) Field of Classification Search
USPC .................. 396/224, 233, 234, 236
See application file for complete search history.

(56) References Cited

U.S. PATENT DOCUMENTS

2002/0034382 A1*  3/2002  Tokunaga et al. ............. 396/157

FOREIGN PATENT DOCUMENTS

| JP | 2000-077644 | 3/2000 |
| JP | 2005-077938 | 3/2005 |
| JP | 2008-309732 | 12/2008 |
| JP | 2010-045293 | 2/2010 |
| JP | 2010-045294 | 2/2010 |

* cited by examiner

*Primary Examiner* — Rochelle-Ann J Blackman
(74) *Attorney, Agent, or Firm* — Cowan, Liebowitz & Latman, P.C.

(57) ABSTRACT

An image capturing apparatus comprises: a photometry unit configured to perform photometry on a subject and output a photometric value; an obtaining unit configured to obtain a plurality of photometric values from the photometry unit during a predetermined period of time; and a calculation unit configured to perform a prediction calculation to predict a luminance of the subject based on the plurality of photometric values obtained by the obtaining unit.

14 Claims, 8 Drawing Sheets

IMAGE CAPTURING APPARATUS, METHOD FOR CONTROLLING IMAGE CAPTURING APPARATUS, AND METHOD FOR PREDICTING PHOTOMETRIC VALUE

BACKGROUND OF THE INVENTION

1. Field of the Invention

The present invention relates to image capturing apparatuses, a method controlling the image capturing apparatus, and a method for predicting photometric values. More particularly, the present invention relates to image capturing apparatuses and methods for predicting photometric values in which the time required for photometry at low luminance is reduced.

2. Description of the Related Art

For image capturing apparatuses such as single-lens reflex cameras etc., a photometric sensor is widely used, which senses the photo current of a photodiode using the LOG characteristics of a diode or the like to measure the luminance of a subject within a wide dynamic range.

In the photometry circuit that utilizes the LOG characteristics, when a power supply voltage is turned on, it takes a long time (steady-state waiting time) to obtain an accurate photometric output after receiving light reflected from the subject, particularly at low luminance where the photo current is very small. Also, in a system (particularly, a single-lens reflex camera) in which a mirror is retracted during shooting so that light to the photodiode is blocked, a degradation in photometric performance due to light response at low luminance leads to a considerably significant problem, such as an increase in release time lag, a decrease in continuous shooting speed, and the like.

Moreover, in recent years, the increase in the sensitivity of imaging devices and the sophistication of image process have led to the advent of digital cameras that have a sensitivity that is as high as several tens of thousands ISO. These cameras require a photometry circuit that has higher photometric performance at low luminance.

In order to solve such a problem, for example, Japanese Patent Laid-Open No. 2005-077938 describes a technique that causes a preliminary current to flow to charge the parasitic capacitances of a photodiode and a logarithmic compression diode during a no-light receiving period, thereby improving the response of the photometry circuit. Also, for example, Japanese Patent Laid-Open No. 2008-309732 describes a technique that preliminarily irradiates a photodiode with light of a light emitting device to generate a photo current to preliminarily charge the parasitic capacitances of the photodiode and a logarithmic compression diode during a no-light receiving period, thereby improving the response of the photometry circuit.

In the technique described in Japanese Patent Laid-Open No. 2005-077938, however, the difference between the preliminary current and the photo current causes an error, and therefore, in order to compensate for the error, a compensation circuit is required, and the circuit size disadvantageously increases.

Also in the technique described in Japanese Patent Laid-Open No. 2008-309732, the difference between the photo current generated by preliminary irradiation and the photo current during photometry causes an error. Further, the requirement of the light emitting device for preliminary irradiation disadvantageously increases the cost, the mounting area, and the like.

SUMMARY OF THE INVENTION

The present invention has been made in consideration of the above situation, and reduces the time required for photometry at low luminance.

According to the present invention, provided is an image capturing apparatus comprising: a photometry unit configured to perform photometry on a subject and output a photometric value; an obtaining unit configured to obtain a plurality of photometric values from the photometry unit during a predetermined period of time; and a calculation unit configured to perform a prediction calculation to predict a luminance of the subject based on the plurality of photometric values obtained by the obtaining unit.

According to the present invention, provided is a method for controlling an image capturing apparatus including a photometry unit configured to perform photometry on a subject and output a photometric value, the method comprising: obtaining a plurality of photometric values from the photometry unit during a predetermined period of time; and performing a prediction calculation to predict a luminance of the subject based on the plurality of photometric values obtained in the obtaining step.

Further, according to the present invention, provided is an image capturing apparatus comprising: a photometry unit, having a photoelectric conversion region that generates charge depending on incident light from a subject and a reset unit configured to reset the photoelectric conversion region to a predetermined voltage, configured to convert the charge generated in the photoelectric conversion region into a photometric value and output the photometric value; a control unit configured to reset the photoelectric conversion region using the reset unit, and after the resetting, obtain a photometric value from the photometry unit a plurality of times at a predetermined timing; and a prediction unit configured to predict a luminance of the subject based on a change in the obtained photometric values and conversion characteristics of the photometry unit after the resetting of the photoelectric conversion region, wherein the conversion characteristics of the photometry unit represent a relationship between the luminance of the subject and the photometric value varying with time after the resetting.

Furthermore, according to the present invention, provided is a method for predicting a photometric value using a photometry unit, having a photoelectric conversion region that generates charge depending on incident light from a subject and a reset unit configured to reset the photoelectric conversion region to a predetermined voltage, configured to convert the charge generated in the photoelectric conversion region into a photometric value and output the photometric value, the method comprising: resetting the photoelectric conversion region using the reset unit; obtaining a photometric value from the photometry unit a plurality of times at a predetermined timing after the resetting; and predicting a luminance of the subject based on a change in the photometric values obtained in the obtaining step and conversion characteristics of the photometry unit after the resetting of the photoelectric conversion region, wherein the conversion characteristics of the photometry unit represent a relationship between the luminance of the subject and the photometric value varying with time after the resetting.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

Figure 1:
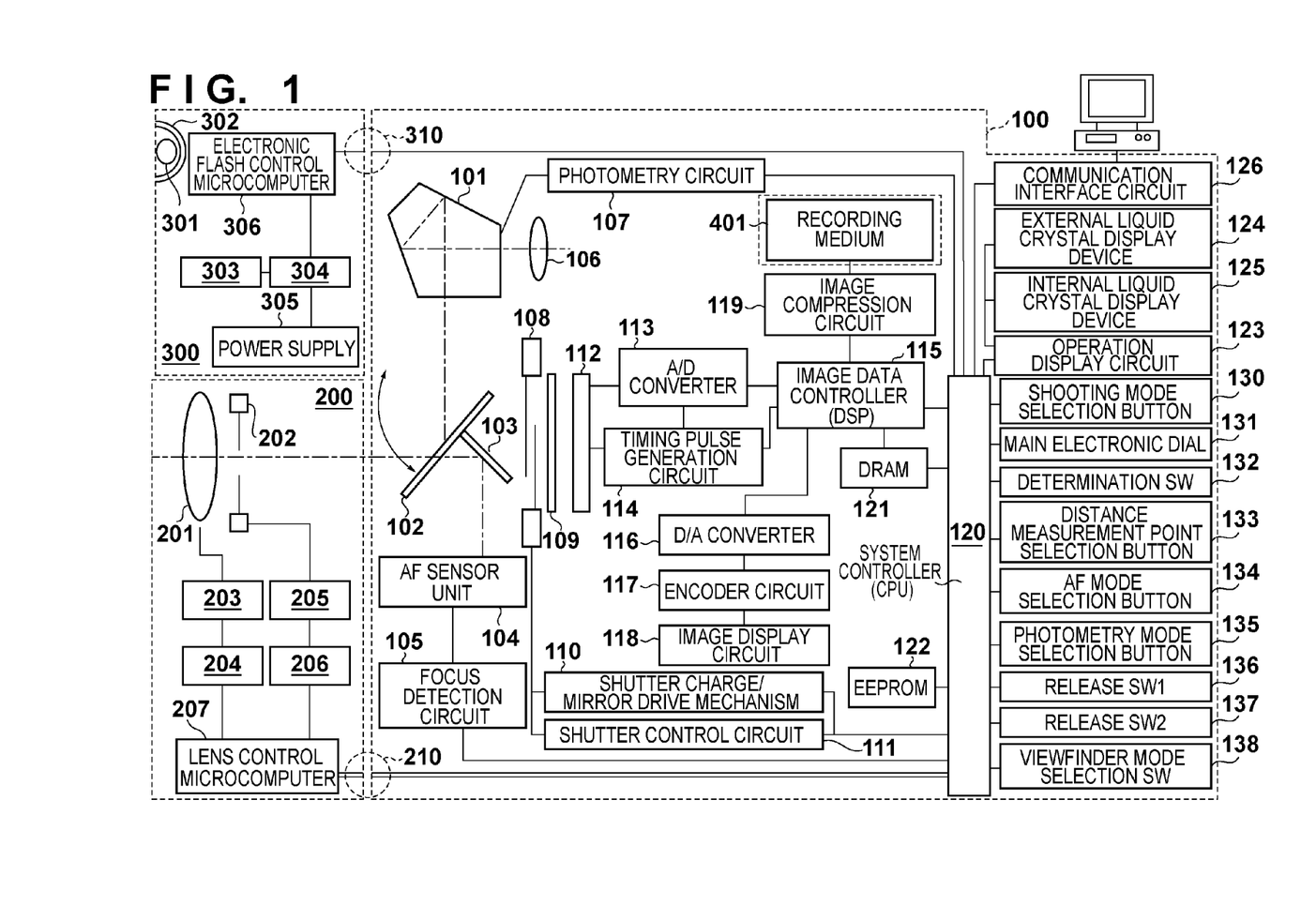
FIG. 1 is a block diagram schematically showing a configuration of a single-lens reflex type digital camera system according to an embodiment.

FIG. 1 is a block diagram schematically showing a configuration of a single-lens reflex type digital camera system according to an embodiment of the present invention. As shown in FIG. 1, in the digital camera system of this embodiment, a shooting lens unit 200 is detachably attached via a lens mount (not shown) to a camera body 100. A mount portion has an electrical connection point group 210. The connection point group 210 has a function of transferring a control signal, a status signal, a data signal, and the like between the camera body 100 and the shooting lens unit 200 and a function of supplying currents having different voltages. The connection point group 210 also has a function of transmitting a signal to a system controller 120 when the shooting lens unit 200 is connected to the camera body 100. As a result, the camera body 100 can communicate with the shooting lens unit 200 to drive the shooting lens 201 and a diaphragm 202 in the shooting lens unit 200. The connection point group 210 may transfer signals via optical communication, audio communication, and the like in addition to electrical communication. Although FIG. 1 shows the shooting lens 201 as a single lens for the sake of simplifying the drawing, it is well known that the shooting lens 201 actually includes a number of lenses.

Rays of light from a subject (not shown) is introduced through the shooting lens 201 and the diaphragm 202 to a quick return mirror 102 drivable in a direction indicated by an arrow. The quick return mirror 102 has a half mirror at a center portion thereof. When the quick return mirror 102 is in the down position, a portion of the rays of light is transmitted through the quick return mirror 102. The transmitted light rays are reflected downward by a sub-mirror 103 provided behind the quick return mirror 102.

Reference character 104 indicates a well-known phase difference method AF sensor unit including a field lens, a reflective mirror, a secondary imaging lens, a diaphragm, a line sensor including a plurality of CCDs, and the like (not shown), which are provided in the vicinity of an image plane. A focus detection circuit 105 controls the AF sensor unit 104 based on a control signal from the system controller 120 to perform focus detection using a well-known phase difference method.

On the other hand, the light rays reflected from the quick return mirror 102 are transmitted through a pentaprism 101 and an eyepiece 106 to reach the eye of the photographer.

A photometry circuit 107 includes a photometric sensor for measuring the luminance of the subject, which is provided in the vicinity of the eyepiece 106. The output of the photometric sensor is supplied from the photometry circuit 107 to the system controller 120.

When the quick return mirror 102 is in the up position, the sub-mirror 103 is folded and retracted from the optical path. Rays of light entering through the shooting lens 201 and the diaphragm 202 reaches an image sensor 112 via a focal plane shutter 108 (mechanical shutter) and a filter 109. Examples of the image sensor 112 include a CCD image sensor, a MOS image sensor, a CdS—Se contact image sensor, an a-Si (amorphous silicon) contact image sensor, a bipolar contact image sensor, and the like. Any of these image sensors may be employed.

The filter 109 has two functions. One function is to cut infrared light and introduce only visible light to the image sensor 112. The other function is to serve as an optical low-pass filter. The focal plane shutter 108 has a front curtain and a rear curtain, and controls the transmission and interruption of rays of light transmitted through the shooting lens 201 and the diaphragm 202.

The camera body 100 of this embodiment also includes the system controller 120 including a CPU that controls the entire digital camera system, and appropriately controls the operation of each unit described below.

A lens control circuit 204 and a diaphragm control circuit 206 are connected via a lens control microcomputer 207 to the system controller 120. The lens control circuit 204 controls a lens drive mechanism 203 for moving the shooting lens 201 in the optical axis direction for focusing. The diaphragm control circuit 206 controls a diaphragm drive mechanism 205 for driving the diaphragm 202. The lens control microcomputer 207 has, for example, a lens memory device for storing lens-specific information about a focal distance, an open aperture value, a lens ID assigned to an individual lens, and the like, and information received from the system controller 120. The system controller 120 controls the lens drive mechanism 203 using the lens control microcomputer 207 to form an image of the subject on the image sensor 112. The system controller 120 also controls the diaphragm drive mechanism 205 for driving the diaphragm 202 based on a set Av value, and outputs a control signal based on a set Tv value to a shutter control circuit 111, thereby controlling exposure. The shutter control circuit 111 controls the travel of the front and rear curtains of the focal plane shutter 108 based on the Tv value.

Also, a shutter charge/mirror drive mechanism 110 that controls the driving of the quick return mirror 102 to the up and down positions and the shutter charging of the focal plane shutter 108, is connected to the system controller 120. Springs are used as drive sources for the front and rear curtains of the focal plane shutter 108. After the travel of the shutter, the springs need to be charged for the next operation. The shutter charge/mirror drive mechanism 110 controls the charging of the springs. The shutter charge/mirror drive mechanism 110 moves the quick return mirror 102 to the up and down positions.

Also, an EEPROM 122 is connected to the system controller 120. The EEPROM 122 stores parameters that need to be adjusted in order to control the camera body 100, camera ID information for identification of an individual digital camera, AF correction data and auto-exposure correction values adjusted using a reference lens, and the like.

Also, an image data controller 115 is connected to the system controller 120. The image data controller 115 includes a digital signal processor (DSP) and, for example, controls the image sensor 112 and corrects and processes image data input from the image sensor 112, based on a command from the system controller 120. The correction and process of image data include auto white balance. The amount of the correction can be changed based on a command from the system controller 120.

Moreover, the image data controller 115 may divide an image signal into regions, integrate the image signal in each region in groups of pixels of a Bayer array (R, G, G, B), and supply the resulting values to the system controller 120, which may in turn evaluate the integrated signal, whereby photometry can be achieved.

A timing pulse generation circuit 114, an A/D converter 113, a DRAM 121, a D/A converter 116, and an image compression circuit 119 are connected to the image data controller 115. The timing pulse generation circuit 114 outputs a pulse signal that is required when the image sensor 112 is driven. The A/D converter 113 and the image sensor 112 receive timing pulses generated by the timing pulse generation circuit 114. The A/D converter 113 converts an analog signal corresponding to the subject image output from the image sensor 112 into a digital signal (image data). The DRAM 121 temporarily stores the image data obtained by the conversion performed by the A/D converter 113, and image data before being processed or converted into a predetermined format.

The image compression circuit 119 compresses or converts (for example, JPEG) image data stored in the DRAM 121. A recording medium 401 is connected to the image compression circuit 119. The image data converted by the image compression circuit 119 is stored in the recording medium 401. Examples of the recording medium 401 includes, but not limited to, a hard disk, a flash memory, a micro DAT, a magneto-optical disk, an optical disk (for example, a CD-R, a CD-WR, etc.), a phase-change optical disk (for example, a DVD etc.), and the like.

Also, an image display circuit 118 is connected via an encoder circuit 117 to the D/A converter 116. The image display circuit 118 displays image data captured by the image sensor 112, and typically includes a color liquid crystal display device. The image data controller 115 controls the D/A converter 116 so that image data stored in the DRAM 121 is converted into an analog signal and the analog signal is output to the encoder circuit 117. The encoder circuit 117 converts the output of the D/A converter 116 into a video signal (for example, an NTSC signal) that is required when the image display circuit 118 is driven.

The image data controller 115 passes the corrected image data through a filter having predetermined frequency characteristics, performs a predetermined gamma process on the resulting image data, evaluates a contrast in a predetermined direction of the resulting image signal, and supplies the result of the evaluation to the system controller 120. The system controller 120 communicates with the lens control circuit 204 to adjust the focal position so that the contrast evaluation value is higher than a predetermined level, whereby contrast-based focus adjustment can be performed.

Also, an operation display circuit 123 that displays information about the operation mode of the camera body 100, exposure information (a shutter speed, an aperture value, etc.), and the like on an external liquid crystal display device 124 or an internal liquid crystal display device 125, is connected to the system controller 120. Also, a shooting mode selection button 130, a main electronic dial 131, and a determination SW 132 that are used to set a mode in which the digital camera system performs an operation desired by the user, is connected to the system controller 120. Also, a distance measurement point selection button 133 for selecting one to be used from a plurality of focus detection positions possessed by the AF sensor unit 104, an AF mode selection button 134, and a photometry mode selection button 135, are connected to the system controller 120. Also, a release switch SW1 (136) for starting a shooting preparation operation, such as photometry, focus adjustment, and the like, a release switch SW2 (137) for starting a shooting operation, and a viewfinder mode selection switch SW138, are connected to the system controller 120.

The viewfinder mode selection switch SW138 switches the viewfinder mode between an optical viewfinder mode in which the subject can be observed via the eyepiece 106, and a live preview display mode in which image signals from the image sensor 112 are sequentially displayed on the image display circuit 118. Further, a communication interface circuit 126 interfaces communication with an external device under control of the system controller 120.

Moreover, an electronic flash device 300 can be detachably attached via a lens mount (not shown) to the camera body 100. The mount portion has an electrical connection point group 310. The connection point group 310 is used to transfer a control signal, a status signal, a data signal, and the like between the camera body 100 and the electronic flash device 300. The connection point group 310 also has an X-terminal (light emission terminal) that controls timing of light emission. The electronic flash device 300 also has a function of, when connected to the camera body 100, transmitting a signal to the system controller 120. As a result, the camera body 100 communicates with the electronic flash device 300 to control light emission of the electronic flash device 300. The connection point group 310 may transfer signals via optical communication, audio communication, or the like in addition to electrical communication.

The electronic flash device 300 includes a xenon (Xe) lamp 301, a reflector 302, a light emission control circuit 303 including an IGBT and the like that controls light emission of the Xe lamp 301, a charging circuit 304, a power supply 305, and a electronic flash control microcomputer 306. The charging circuit 304 generates a voltage of about 300 V that is fed to the Xe lamp 301. The power supply 305 is, for example, a battery that feeds power to the charging circuit 304. The electronic flash control microcomputer 306 controls light emission, charging, and the like of the electronic flash device 300, and communication with the system controller 120 in the camera body 100.

Figure 2:
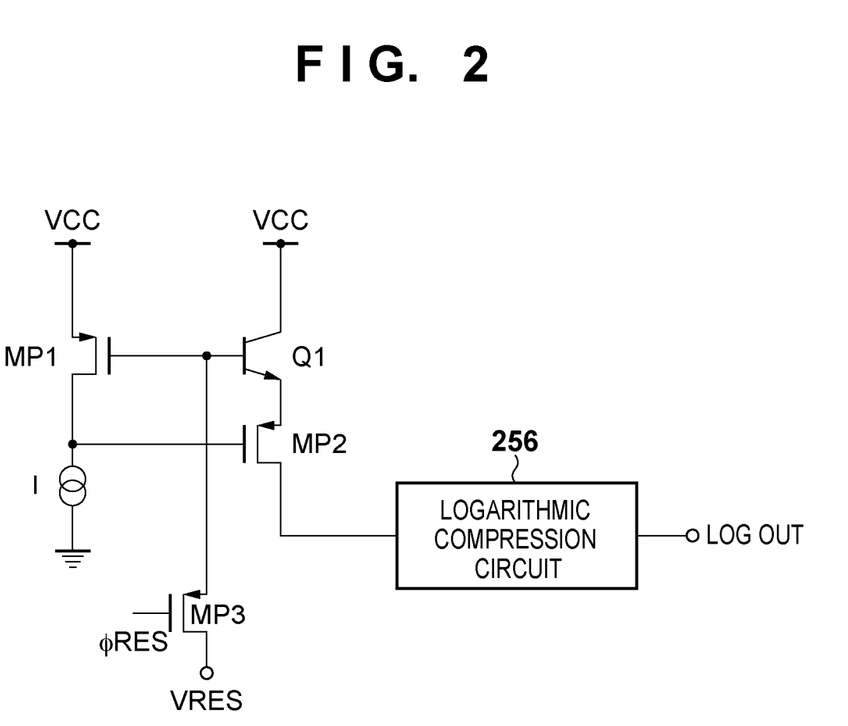
FIG. 2 is an example circuit diagram showing a photometry circuit.

FIG. 2 is an example circuit diagram showing a detailed configuration of the photometry circuit 107 of FIG. 1. In FIG. 2, reference character Q1 indicates an NPN phototransistor that has a photoelectric conversion region that generates charge, depending on incident light. Reference character MP1 indicates a PMOS for fixing the base potential of the phototransistor Q1. Reference character I indicates a current source that is a load for the PMOS (MP1). Reference character MP2 indicates a PMOS for feeding the gate potential of the PMOS (MP1) back to the drain of MP1. Reference character MP3 indicates a PMOS for performing a reset operation in order to forcibly inject carriers into the phototransistor Q1. Reference character 256 indicates a logarithmic compression circuit for logarithmically compressing the emitter current of the phototransistor Q1.

Note that the configuration of the photometry circuit 107 is not limited to that of FIG. 2, and may be any circuit configuration that can reset the base potential (photoelectric conversion region) of the phototransistor. For example, circuits described in Japanese Patent Laid-Open Nos. 2000-77644, 2010-45293, 2010-45294, and the like may be used, as a circuit configuration that can reset the base potential of the phototransistor, in the photometry circuit 107.

The gate voltage of the PMOS (MP1) through which a constant current flows has a constant potential difference Vth from a voltage VCC, and therefore, the base potential of the phototransistor Q1 is also constant regardless of the intensity of light entering the phototransistor Q1. Also, a feedback loop is formed using the PMOS (MP2) to further stabilize the base potential of the phototransistor Q1. As a result, it is not necessary to charge or discharge a large base capacitance Vcb. Therefore, the response of the photometry circuit of FIG. 2 is determined based on an emitter capacitance Veb and the drain capacitance of the PMOS (MP2), that are smaller than a collector capacitance, and a photo current. Therefore, at low luminance where the influence of the response starts to be effective, the photometric value is higher than an actual luminance. If an exposure control is performed based on the photometric value higher than an actual luminance, an underexposed image is captured.

Figure 3A:
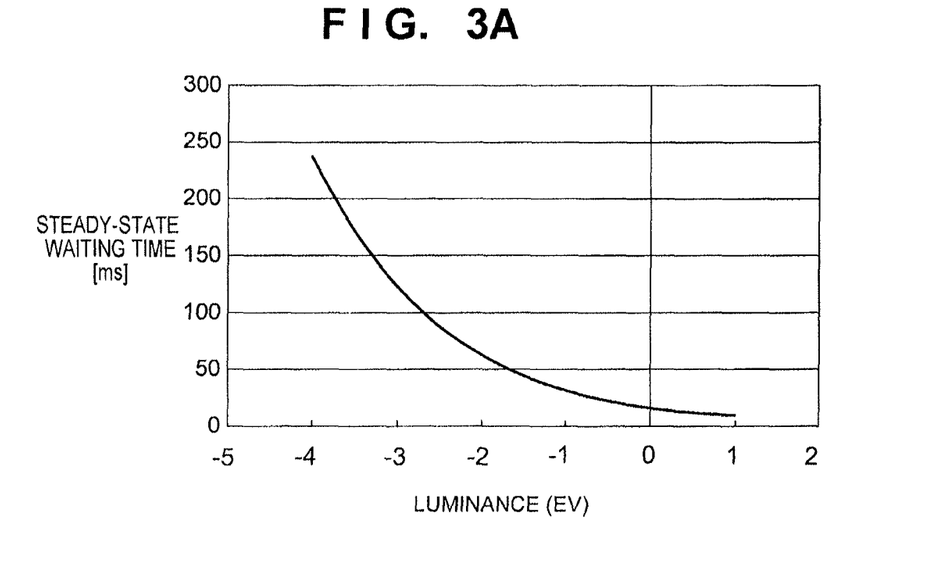
FIGS. 3A and 3B are diagrams schematically showing the response of the photometry circuit to different luminances.
Figure 3B:
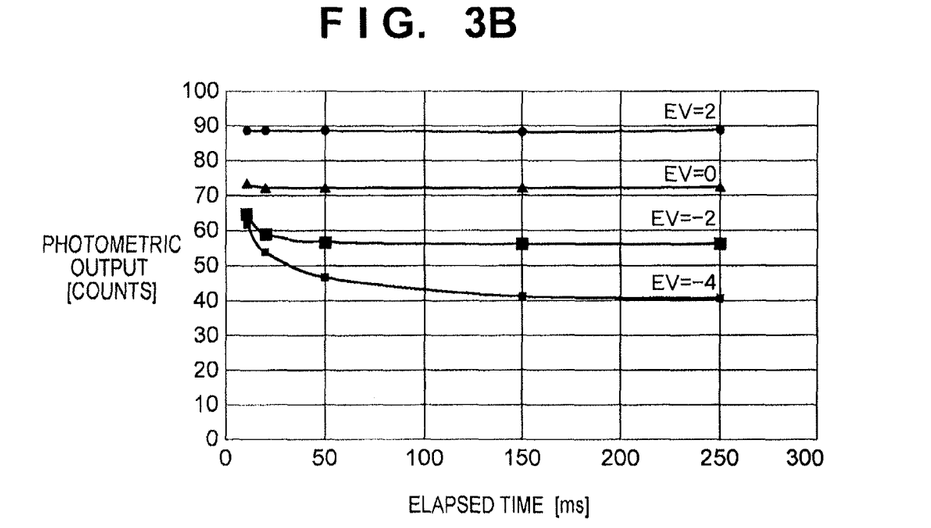

FIGS. 3A and 3B are diagrams schematically showing the response (conversion characteristics) of the photometry circuit to different luminances. FIG. 3A shows a relationship between the luminance of the subject and the time (steady-state waiting time) that it takes for the output of the photometry circuit 107 of FIG. 2 to become steady after the reset operation. This relationship is determined based on the aforementioned relationship between the emitter capacitance Veb and the drain capacitance of the PMOS (MP2), and the photo current. As can be seen from FIG. 3A, in the vicinity of a point where an EV value corresponding to the luminance is zero, the steady-state waiting time starts to increase to a level that has an influence on the operation sequence of the camera. As the EV value decreases (darker) from zero, the steady-state waiting time exponentially increases.

FIG. 3B is a diagram showing how the output of the photometry circuit 107 approaches a steady state as time passes. The vertical axis represents the result of A/D conversion of the output of the photometry circuit 107, and the horizontal axis represents the elapsed time from the reset operation. In the example of FIG. 3B, the output (photometric output) of the photometry circuit 107 is read out after 10, 20, 50, 150, and 250 ms, and the resulting values are plotted. Different graphs are obtained at different luminances, showing changes in the output of the photometry circuit 107 at the EV value of 2, 0, −2, and −4. As can be seen from FIG. 3B, the graph of the output of the photometry circuit 107 that continues until the steady output is reached after the reset operation varies depending on the EV value. If the EV value is the same, there are substantially no variations in the graph. Therefore, a steady-state photometric output can be predicted by performing a read operation a plurality of times during a period of time until the steady state is reached.

Figure 4:
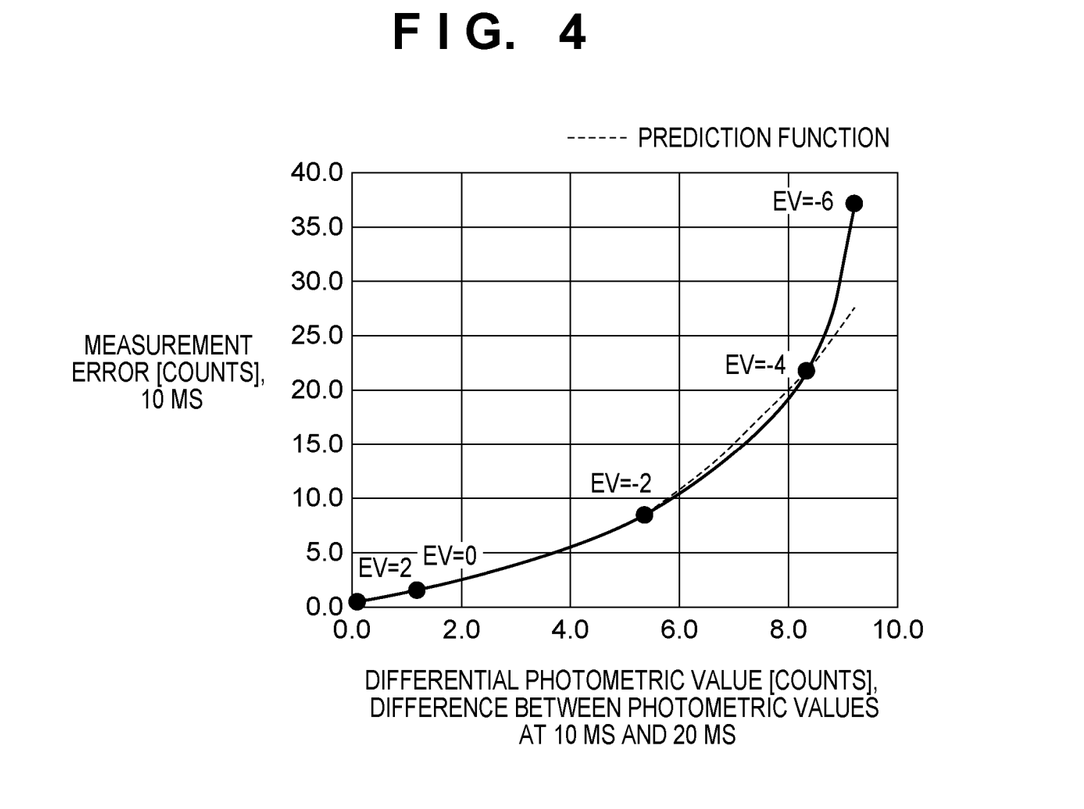
FIG. 4 is a diagram showing a relationship between differences between photometric values output from the photometry circuit and measurement errors.

FIG. 4 is a diagram for describing a prediction algorithm. A prediction operation will be described with reference to FIG. 4. In FIG. 4, the vertical axis represents a difference between a photometric output read out 10 ms after the reset operation and a photometric output when a steady state is reached, i.e., a measurement error that occurs at each EV value when the photometric output is read out 10 ms after the reset operation. The horizontal axis represents a difference (differential photometric value) between a photometric output read out 10 ms after the reset operation and a photometric output read out 20 ms after the reset operation, at each EV value.

In FIG. 4, the solid line is calculated based on the photometric output. As the luminance decreases (darker) (the EV value decreases), both the measurement error and the differential photometric value increase, i.e., correlate with each other. The dashed line in FIG. 4 is fitted to the solid graph using a cubic prediction function. As shown in FIG. 4, the dashed line satisfactorily agrees with the solid line within the EV value range of about 2 to −4, and therefore, it can be seen that photometry can be performed by prediction. It can also be seen that, at luminances where the EV value is less than −4, the prediction accuracy is gradually degraded. At a considerably low luminance where the EV value is −6, in an initial state in which a steady state is waited after the reset operation is performed to inject carriers into the base of the phototransistor Q1, the injected carriers are overwhelmingly dominant as an emitter current component of the phototransistor Q1. Therefore, it is difficult to obtain a sufficient prediction accuracy. In order to improve the accuracy, an additional read operation may be performed, and prediction may be performed using a prediction function having a different order or coefficient. The number of times of a read operation for prediction may be set to a well-balanced value, taking into consideration the release time lag acceptable for the camera, the shooting mode (continuous shooting, single shooting, etc.), the continuous shooting speed of the mounted camera, or the like. In some cameras, for example, the steady-state waiting time for a predictive read operation may be changed.

Figure 5:
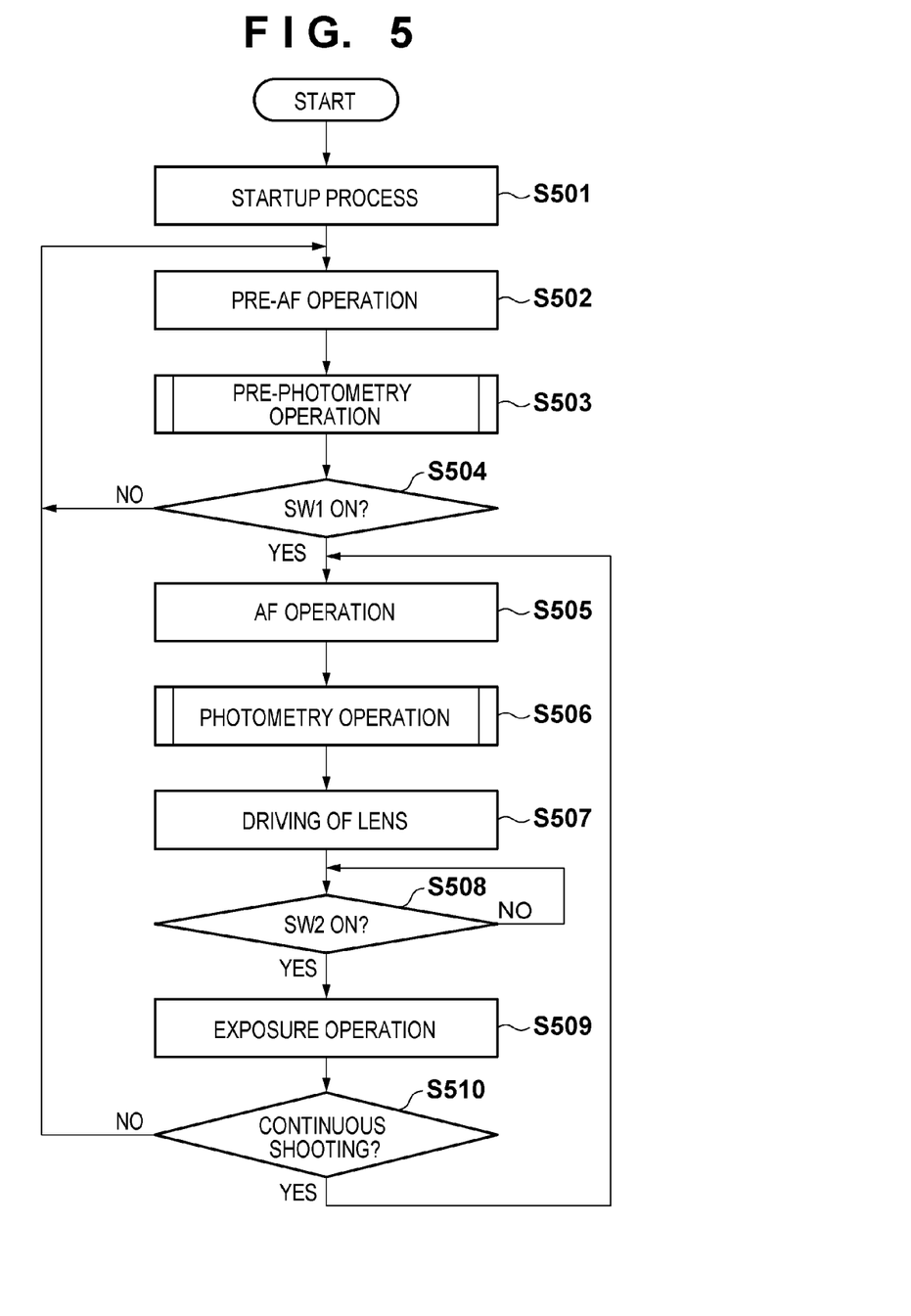
FIG. 5 is a flowchart showing a shooting sequence according to the embodiment.

FIG. 5 is a flowchart showing a shooting sequence in this embodiment. Initially, when the digital camera system is turned on, in step S501 a startup process that is performed immediately after the digital camera system is turned on is performed, including the initialization of memories for the CPU and the like. The startup process will not be described in detail. In step S502, a pre-AF operation is performed regardless of whether or not the release button has been operated. The pre-AF operation is a known technique and therefore will not be described herein. Similarly, in step S503, a pre-photometry operation is performed. The pre-photometry operation performed in step S503 will be described in detail below. The result of pre-photometry is reflected on exposure display and the like.

In step S504, the state of the release switch SW1 (136) that is turned on when the release button is pressed to the first stroke, is checked. If SW1 is off, control returns to step S502, and if SW1 is on, control proceeds to step S505. In step S505, the focus detection circuit 105 is operated to perform an AF operation in which the focus state of the shooting lens 201 is detected. The AF operation is a known technique and will not be described herein. In step S506, the photometry circuit 107 is used to perform a photometry operation. The photometry operation performed herein will be described in detail below. In step S507, based on the result of the detection of the focus state in step S505, the shooting lens 201 is driven to the focus position, and control proceeds to step S508.

In step S508, the state of the release switch SW2 (137) that is turned on when the release button is pressed to the second stroke, is checked. If SW2 is off, control returns to step S508, in which the checking of the release switch SW2 is continued. If SW2 is on, control proceeds to step S509, in which based on the aperture value calculated based on the photometry result of step S506, the diaphragm control circuit 206 is operated to cause the diaphragm drive mechanism 205 to control the diaphragm 202. In parallel with this control, the quick return mirror 102 is moved from the shooting ready position (down position) to the shooting position (up position). Thereafter, an exposure operation is performed at a shutter speed that is calculated based on the photometry result. After exposure, the diaphragm 202 and the quick return mirror 102 are returned to the shooting ready position, so that the exposure operation is completed.

Next, in step S510, the shooting mode is checked. If the shooting mode is set to the continuous shooting mode, control proceeds to step S505. Otherwise, control returns to step S502. The camera shooting sequence has been roughly described. Note that operations following the turning on, other switching, and the like are not directly relevant to the present invention and will not be described.

Figure 6:
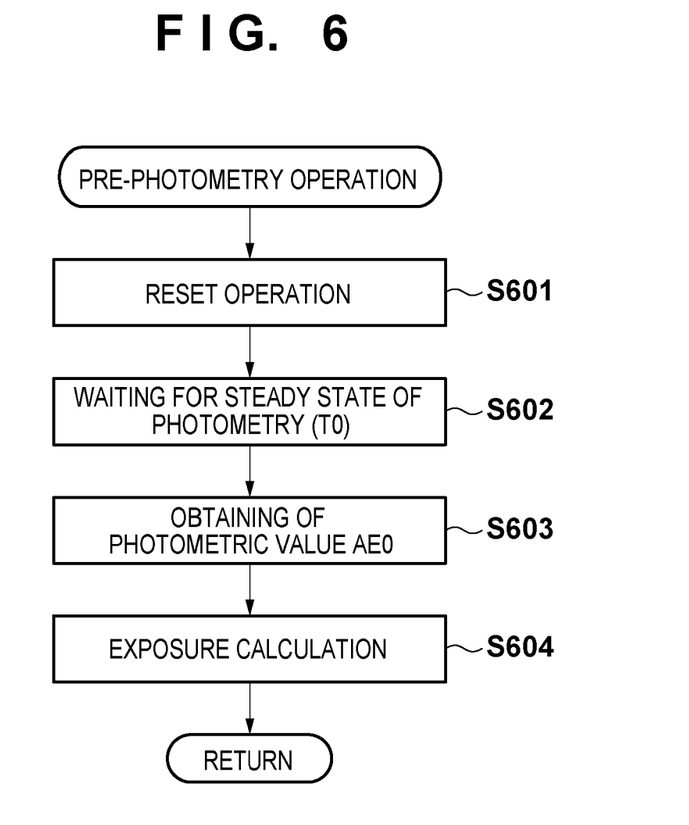
FIG. 6 is a flowchart showing a pre-photometry operation.

FIG. 6 is a flowchart showing details of the pre-photometry operation performed in S503 of FIG. 5. The pre-photometry operation will be described in detail hereinafter with reference to FIG. 6. When the pre-photometry operation begins, in step S601 the photometry circuit 107 is activated to perform the reset operation. In this case, the PMOS (MP3) is turned on so that carriers are forcibly injected to the base of the phototransistor Q1. In step S602, the steady state of photometry is waited for a period of time T0, and the photometry circuit 107 waits until the emitter capacitance of the phototransistor Q1 and the drain capacitance of the PMOS (MP2) are steady at a level depending on incident light. Some long period of time may be allocated to pre-photometry, which does not cause a problem, because the release button is not operated for pre-photometry. Therefore, for example, the pre-photometry time is set to about 200 ms. As shown in FIG. 3B, after the steady-state waiting time T0, photometry can be correctly performed even at the EV value of as low as −4. In step S603, the output of the photometry circuit 107 is read out and stored as a photometric value AE0 into a memory. In step S604, a luminance value BV is calculated from the photometric value AE0, and further, the APEX values Tv and Av are calculated based on camera settings, and pre-photometry is ended.

If some long period of time may be allocated to pre-photometry, the steady-state waiting time may be set to be long. However, for cameras for professional use, a main priority is to quickly start up and get ready to shoot after being turned on. In the professional-use camera, when pre-photometry is performed, a photometric value may be predicted by a prediction operation (steps S706-S720) described below with reference to FIGS. 7A and 7B.

Figure 7A:
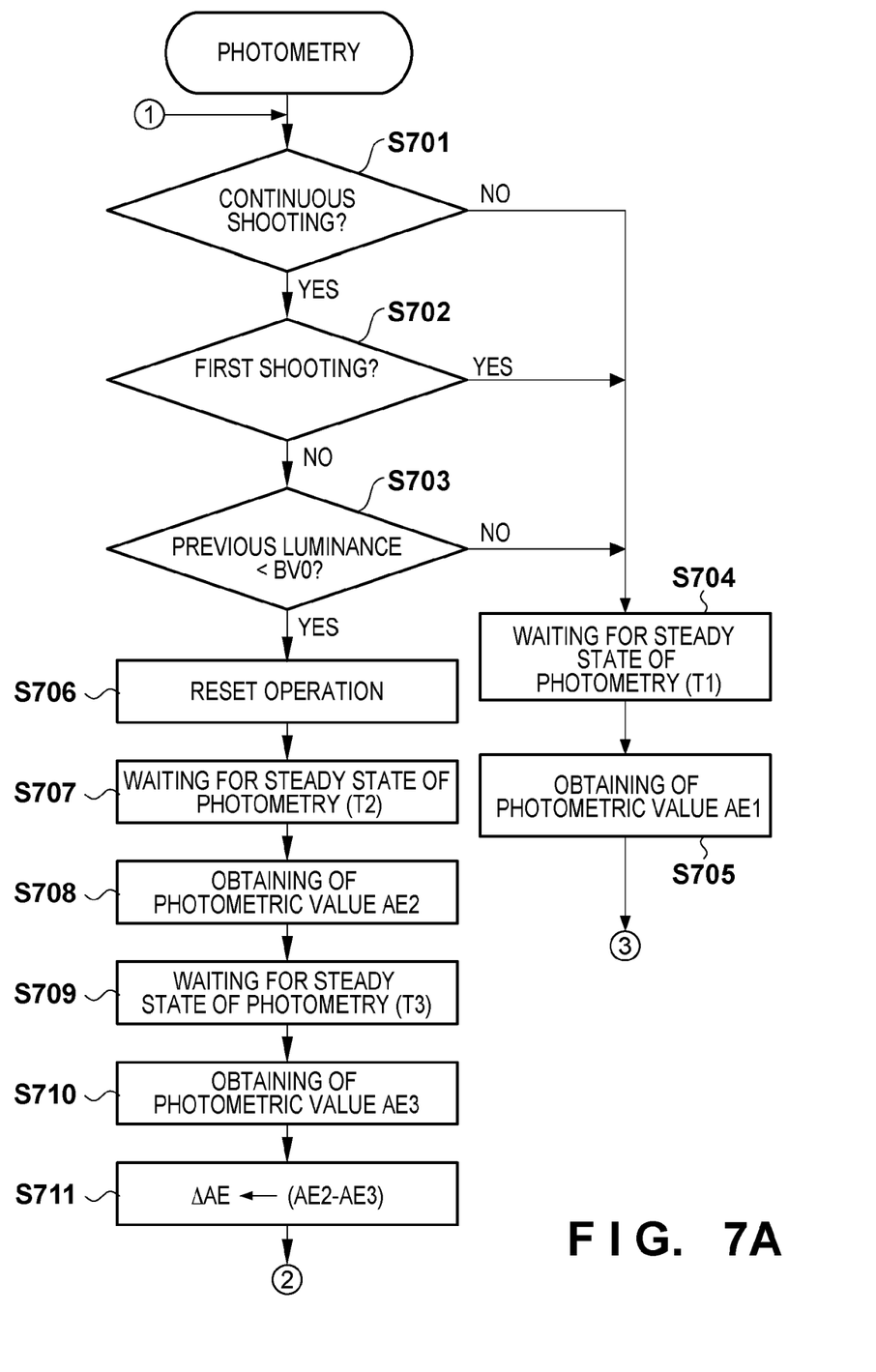
FIGS. 7A and 7B are flowcharts showing a photometry operation.
Figure 7B:
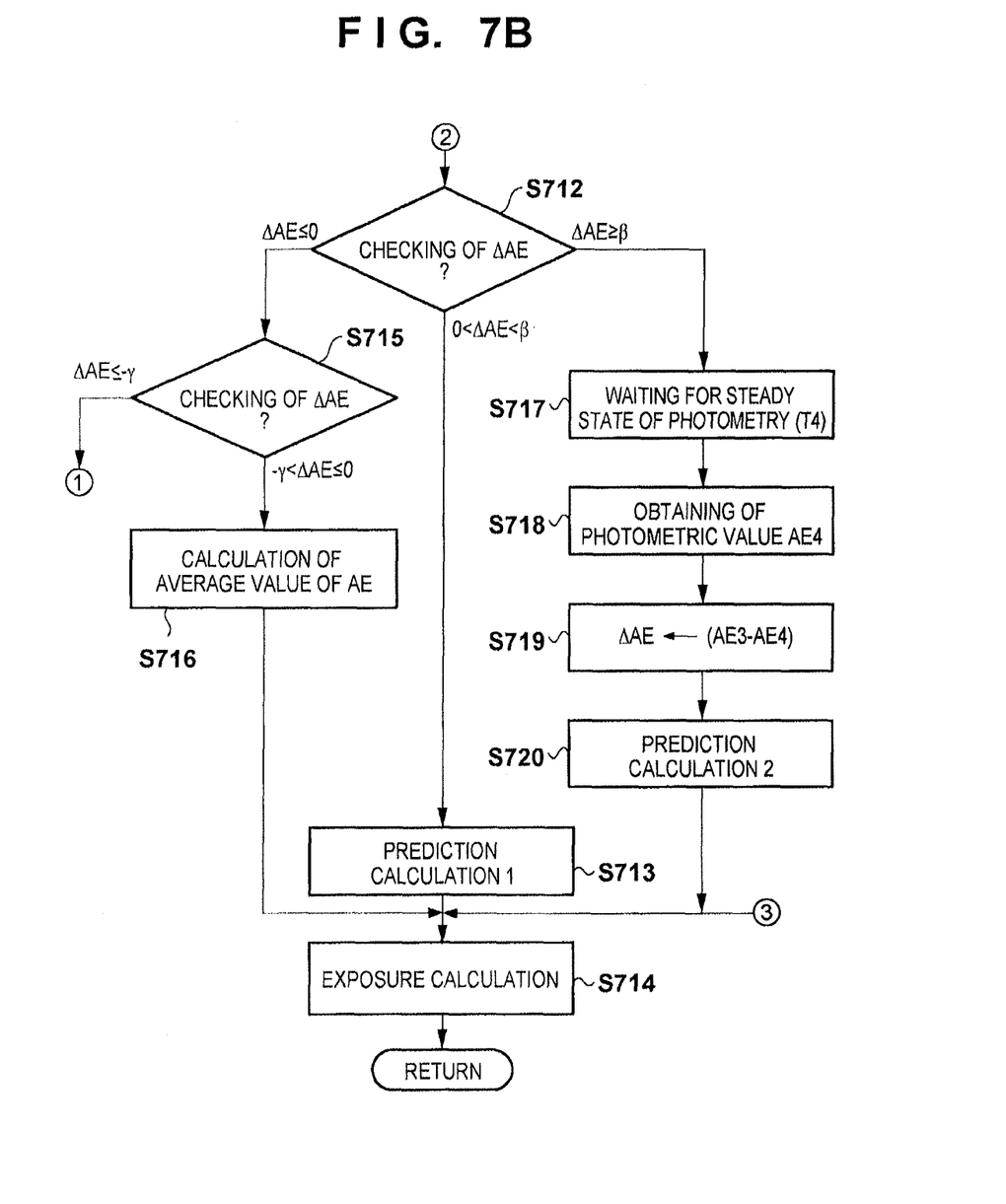

FIGS. 7A and 7B are flowcharts for describing details of the photometry operation performed in step S506 of FIG. 5. The photometry operation will be described in detail hereinafter with reference to FIGS. 7A and 7B. When the photometry operation as a subroutine begins, in step S701 it is determined whether or not the shooting mode is set to the continuous shooting mode. If the shooting mode is not set to the continuous shooting mode, control proceeds to step S704, and if the shooting mode is set to the continuous shooting mode, control proceeds to step S702.

In step S702, it is determined whether or not the current shooting is the first one in continuous shooting. If the current shooting is the first one, control proceeds to step S704, and if the current shooting is the second one or later, control proceeds to step S703. In step S703, it is determined whether or not the luminance value in the previous one in continuous shooting is greater than or equal to a predetermined luminance value BV0. If the previous luminance value is the luminance value BV0 or more, control proceeds to step S704, and if the previous luminance value is less than the luminance value BV0, control proceeds to step S706. The determination in step S703 is performed for the following reason. When the first exposure operation causes the quick return mirror to retract to the shooting position, so that light that would otherwise enter the photometry circuit 107 is blocked, the base of the phototransistor Q1 transitions from a steady state in the presence of received light to a steady state in the absence of received light while the light is being blocked. If the previous luminance value is less than the predetermined luminance value BV0, a steady-state waiting time as measured from the transitioned state (the steady state in the absence of received light) is long, and therefore, the prediction operation needs to be performed. As can be seen from FIG. 3A, it takes a long time to transition to the steady state in the absence of received light. Therefore, if the shutter speed is high and the no-light receiving period is short because of the luminance value in the previous shooting, i.e., the previous luminance value is the predetermined luminance value BV0 or more, prediction is not performed, whereby scenes for which the prediction operation is performed are reduced. As a result, scenes for which the photometry time is short can be increased as described below. Note that it has been assumed above that the prediction operation is not performed if the previous luminance value is greater than or equal to the predetermined luminance value BV0. Alternatively, the prediction operation may not be performed if the previous shutter speed is lower than a predetermined shutter speed.

In step S704, the prediction operation is not performed, and a steady state of photometry is waited for a period of time T1. Because the photometry circuit 107 is in the steady state due to the pre-photometry operation, the photometry steady-state waiting time may be as short as about 5 ms. Similarly, when the previous luminance value is greater than or equal to the predetermined luminance value BV0, the difference from the steady state is small, i.e., the steady state is substantially established, the photometry steady-state waiting time may be as short as about 5 ms. In step S705, a photometric value is read out from the photometry circuit 107 and stored as AE1 into a memory. In step S714, an exposure calculation similar to step S604 is performed.

On the other hand, if it has been determined in step S703 that the previous luminance value is less than the luminance value BV0, in step S706 the reset operation is performed. In step S707, after the reset operation, a steady state of photometry is waited for a period of time T2. The steady-state waiting time T2 is set to a value (for example, 10 ms) with which injected carriers are discharged to a predetermined degree to increase the ratio of a photo current occurring due to incident light to the emitter current of phototransistor Q1. In step S708, a photometric value is read out from the photometry circuit 107 and stored as AE2 into a memory. In step S709, a steady state of photometry is waited again for a period of time T3. The steady-state waiting time in this case is set to a value (for example, about 10 ms) with which a slope required for prediction is obtained. In step S710, a photometric value is read out from the photometry circuit 107 and stored as AE3 into a memory. In step S711, the difference between AE2 and AE3 is calculated and stored as ΔAE into a memory. In step S712, based on the value of ΔAE, one of three processes described below is performed.

Initially, if 0<ΔAE<β, control proceeds to step S713 in which a prediction calculation 1 is performed to calculate a photometric value. In the prediction calculation 1, for example, fitting is performed using the following cubic function to predict the photometric value AE.

$$AE = AE2 - a \times \Delta AE^3 + b \times \Delta AE^2 + c \times \Delta AE + d \qquad (1)$$

In step S714, based on this result, the exposure calculation is performed, and the subroutine is ended. When the prediction calculation 1 is performed, photometry can be satisfactorily performed even at the EV value of as low as −4 (FIG. 4) during a period of time of about 30 to 50 ms. If the prediction is not performed, a steady-state waiting time of about 200 ms is required. Thus, the prediction operation can significantly reduce the time required for photometry.

If $\Delta AE \geq \beta$, the current scene is considered to be a low-luminance scene for which the influence of injected carrier makes it difficult to perform the prediction by function (1) as described in FIG. 4. Therefore, control proceeds to step S717 in which a steady state of photometry is further waited for a period of time T4. In step S718, a photometric value AE4 is obtained. The period of time T4 is similar to T3, i.e., about 10 ms. In step S719, the difference between AE3 and AE4 is calculated and stored as $\Delta AE$ into a memory. In step S720, a prediction calculation 2 is performed. In the prediction calculation 2, for example, fitting is performed using the following cubic function to predict the photometric value AE.

$$AE = AE3 - A \times \Delta AE^3 + B \times \Delta AE^2 + C \times \Delta AE + D \qquad (2)$$

In step S714, based on this result, the exposure calculation is performed, and the subroutine is ended. The prediction calculation 2 requires a period of time that is longer by 20 to 30 ms than that of the prediction calculation 1. Despite this, the time required for photometry can be significantly reduced compared to the steady-state waiting time of about 200 ms required when prediction is not performed.

If $\Delta AE \leq 0$, control proceeds to step S715. If the value of $\Delta AE$ falls within the range of $-\gamma < \Delta AE \leq 0$ in step S715, control proceeds to step S716. If $\Delta AE$ is in the vicinity of 0, there is some large amount of incident light, and the photometry circuit 107 is sufficiently steady during the prediction operation. Therefore, the value of $\gamma$ is set to a value of, for example, about $\frac{1}{8}$ to $\frac{1}{3}$ based on variations in the photometric output or the acceptable value of exposure of the camera. In step S716, an average value of AE2 and AE3 is calculated. In step S714, based on the average value, the exposure calculation is performed, and the subroutine is ended. If $\Delta AE \leq -\gamma$ it is considered that the scene is changed and the luminance of the subject is changed to a higher value, and therefore, control returns to step S701, in which photometry is performed again.

As described above, according to this embodiment, a photometric value can be predicted based on the conversion characteristics of the photometry circuit 107 into photometric values with respect to the subject depending on the elapsed time after resetting of the photoelectric conversion region of the photometry circuit 107. Specifically, a plurality of photometric values are obtained from the photometry circuit 107 during a predetermined period of time, and based on the obtained photometric values, the luminance of the subject can be predicted, whereby the response of the photometry circuit at low luminance can be improved. The predetermined time period in this embodiment is a period of time between when the reset operation is performed on the photometry circuit 107 and when a predetermined time has just elapsed, and in other words, a period of time during which the photometric value output from the photometry circuit 107 is not steady, or a period of time during which the photometric value output from the photometry circuit 107 does not correspond to the luminance of the subject.

It may be determined whether or not it is necessary to predict a photometric value, based on the luminance of the subject or the operating state of the digital camera system. If prediction is performed only when necessary, photometry appropriate to the situation can be performed.

Note that the photometric value AE corresponding to the luminance of the subject is obtained by the prediction calculation. The photometric value corresponding to the luminance of the subject is equivalent to the luminance of the subject, and the prediction of the photometric value corresponding to the luminance of the subject is an example method for predicting the luminance of the subject. In other words, the luminance of the subject may be predicted by obtaining the luminance value BV, the EV value, or the like. In this case, a process of converting the photometric value into the luminance value BV or the EV value may be added to the prediction calculation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-260366, filed on Nov. 22, 2010 which is hereby incorporated by reference herein in its entirety.

What is claimed is:

1. An image capturing apparatus comprising:
    a photometry unit configured to perform photometry on a subject and output a photometric value;
    an obtaining unit configured to obtain a plurality of photometric values from the photometry unit during a predetermined period of time without changing conditions of photometry; and
    a calculation unit configured to perform a prediction calculation to predict a luminance of the subject based on the plurality of photometric values obtained by the obtaining unit and conversion characteristics of the photometry unit.

2. The image capturing apparatus according to claim 1, wherein the obtaining unit obtains the plurality of photometric values from the photometry unit before the lapse of a predetermined period of time after a reset operation is performed on the photometry unit.

3. The image capturing apparatus according to claim 1, wherein the obtaining unit obtains the plurality of photometric values from the photometry unit during a period of time that the photometric value output from the photometry unit is not steady.

4. The image capturing apparatus according to claim 1, wherein the obtaining unit obtains the plurality of photometric values from the photometry unit during a period of time that the photometric value output from the photometry unit does not represent the luminance of the subject.

5. The image capturing apparatus according to claim 1, wherein
    the obtaining unit obtains a first photometric value at a first timing during the predetermined period of time, and obtains a second photometric value at a second timing later than the first timing during the predetermined period of time, and
    the calculation unit decides whether or not to perform the prediction calculation, depending on a difference between the first and second photometric values.

6. The image capturing apparatus according to claim 5, wherein the calculation unit, if not performing the prediction calculation, calculates an average value of the first and second photometric values.

7. The image capturing apparatus according to claim 1, wherein the calculation unit performs the prediction calculation to predict a photometric value corresponding to the luminance of the subject.

8. The image capturing apparatus according to claim 1, wherein the calculation unit does not perform the prediction calculation before a first shooting in continuous shooting is performed.

9. The image capturing apparatus according to claim 1, wherein the calculation unit performs the prediction calculation based on a response of the photometry unit to the luminance of the subject.

10. An image capturing apparatus comprising:
   a photometry unit configured to perform photometry on a subject and output a photometric value;
   an obtaining unit configured to obtain a plurality of photometric values from the photometry unit during a predetermined period of time, the plurality of photometric values including a first photometric value obtained at a first timing during the predetermined period of time, and a second photometric value obtained at a second timing later than the first timing during the predetermined period of time; and
   a calculation unit configured to perform a prediction calculation to predict a luminance of the subject based on the plurality of photometric values obtained by the obtaining unit,
   wherein if the second photometric value is greater than or equal to the first photometric value, the calculation unit does not perform the prediction calculation.

11. An image capturing apparatus comprising:
   a photometry unit configured to perform photometry on a subject and output a photometric value;
   an obtaining unit configured to obtain a plurality of photometric values from the photometry unit during a predetermined period of time, the plurality of photometric values including a first photometric value obtained at a first timing during the predetermined period of time, a second photometric value obtained at a second timing later than the first timing during the predetermined period of time, and
   a third photometric value at a third timing later than the second timing during the predetermined period of time if the first photometric value is greater than the second photometric value by a predetermined value or more; and
   a calculation unit configured to perform a prediction calculation to predict a luminance of the subject based on the plurality of photometric values obtained by the obtaining unit;
   wherein the calculation unit, when the third photometric value has been obtained from the photometry unit, performs the prediction calculation based on the second and third photometric values.

12. A method for controlling an image capturing apparatus including a photometry unit configured to perform photometry on a subject and output a photometric value, the method comprising:
   obtaining a plurality of photometric values from the photometry unit during a predetermined period of time without changing conditions of photometry; and
   performing a prediction calculation to predict a luminance of the subject based on the plurality of photometric values obtained in the obtaining step and conversion characteristics of the photometry unit.

13. An image capturing apparatus comprising:
   a photometry unit, having a photoelectric conversion region that generates charge depending on incident light from a subject and a reset unit configured to reset the photoelectric conversion region to a predetermined voltage, configured to convert the charge generated in the photoelectric conversion region into a photometric value and output the photometric value;
   a control unit configured to reset the photoelectric conversion region using the reset unit, and after the resetting, obtain a photometric value from the photometry unit a plurality of times at a predetermined timing without changing conditions of photometry; and
   a prediction unit configured to predict a luminance of the subject based on a change in the obtained photometric values and conversion characteristics of the photometry unit after the resetting of the photoelectric conversion region,
   wherein the conversion characteristics of the photometry unit represent a relationship between the luminance of the subject and the photometric value varying with time after the resetting.

14. A method for predicting a photometric value using a photometry unit, having a photoelectric conversion region that generates charge depending on incident light from a subject and a reset unit configured to reset the photoelectric conversion region to a predetermined voltage, configured to convert the charge generated in the photoelectric conversion region into a photometric value and output the photometric value, the method comprising:
   resetting the photoelectric conversion region using the reset unit;
   obtaining a photometric value from the photometry unit a plurality of times at a predetermined timing after the resetting without changing conditions of photometry; and
   predicting a luminance of the subject based on a change in the photometric values obtained in the obtaining step and conversion characteristics of the photometry unit after the resetting of the photoelectric conversion region,
   wherein the conversion characteristics of the photometry unit represent a relationship between the luminance of the subject and the photometric value varying with time after the resetting.

* * * * *